United States Patent

Everett

[15] 3,669,150

[45] June 13, 1972

[54] HYDRODYNAMIC SURGE ABSORBING APPARATUS

[72] Inventor: Wilhelm Sydow Everett, Santa Paula, Calif.

[73] Assignee: American Air Filter Company, Inc.

[22] Filed: March 19, 1970

[21] Appl. No.: 20,910

[52] U.S. Cl. ................................ 138/26, 137/207, 417/543

[51] Int. Cl. ................................ F16l 55/04

[58] Field of Search ................ 137/207, 568; 138/26, 30; 210/512; 417/543

[56] References Cited

UNITED STATES PATENTS

| | | | |
|---|---|---|---|
| 3,292,661 | 12/1966 | Everett | 138/26 |
| 1,768,550 | 7/1930 | Fekete | 210/512 X |
| 3,146,796 | 9/1964 | Everett | 138/26 |
| 3,329,093 | 7/1967 | Bear | 138/26 X |

*Primary Examiner*—Edward J. Earls
*Attorney*—Pastoriza & Kelly

[57] ABSTRACT

A hydrodynamic surge absorbing apparatus for connection to a header pipe in a sewage piping system comprises a closed spherical vessel incorporating a swirl chamber in the form of an inverted truncated cone. This cone has an upper tangential inlet connected to the header pipe and a lower central outlet at the truncated apex portion communicating with the interior of the vessel at a level below liquid normally filling a portion of the vessel. Surges in the header pipeline of the system result in liquid flow through the swirl chamber into the vessel to compress air or gas above the liquid in the vessel and liquid flow out of the vessel back up through the surge chamber to the line the resistance to such flow being controlled by the geometry of the swirl chamber and gas pressure in the vessel so as to effectively absorb the surges in the piping sewage system.

7 Claims, 3 Drawing Figures

PATENTED JUN 13 1972 3,669,150

INVENTOR.
WILHELM SYDOW EVERETT
BY Pastoriza & Kelly.
ATTORNEYS

HYDRODYNAMIC SURGE ABSORBING APPARATUS

This invention relates to surge absorbing apparatus and more particularly to an improved hydrodynamic surge absorbing apparatus particularly useful in sewage piping systems for alleviating shock and surges caused by the starting and shutting down of pumps in the sewage system.

BACKGROUND OF THE INVENTION

In my U.S. Pat. No. 3,292,661 issued Dec. 20, 1966 there is described a fluid surge dampener having general application to fluid piping systems for dampening water "hammer" or equivalent high pressure surges as may occur as a consequence of valve closure, pump stoppage, or a failure, and the like. Towards this end, the patent describes a unique swirl chamber construction incorporating a "bullet" member and vane for realizing a desired vortex condition in the swirl chamber to provide optimum absorption of energy of fluid flowing into or out of the dampener to effect the desired overall surge absorption in the piping system.

In certain applications such as liquid sewage systems wherein a mixture of liquid and solid particles or other debris is pumped through pipelines in the system, it is important that any type of surge absorbing apparatus be so designed and constructed as to minimize the possibility of clogging or build up of debris and the like in the system which can change the resistance flow characteristics. Any such undesired collection of debris in the dampener structure can alter the characteristics relatively quickly with the result that the apparatus is no longer effective in providing proper absorption after a few hours or days of use. It would therefor be desirable to provide a surge absorber in which the possibilities of such clogging and the like are minimized and yet in which proper effective resistance to flow control is fully realized.

BRIEF DESCRIPTION OF THE PRESENT INVENTION

The present invention contemplates an improved hydrodynamic type surge absorbing apparatus particularly designed for use in liquid transmission sewage systems such as to minimize the possibilities of clogging of the absorber as a consequence of the presence of such solid particles and debris in the piping system.

Briefly, the apparatus itself comprises a closed vessel and cooperating swirl chamber having an upper tangential inlet and lower central outlet. The horizontal circular cross-sectional area of the chamber is larger in size at the inlet than at the outlet such that liquid passed tangentially into the inlet swirls around to define a vortex prior to flow out the central outlet. Inlet means sealingly connects the upper tangential inlet of the swirl chamber to a header pipe in the sewage system preferably at a point following the outlet of the pump check valves. The lower outlet of the swirl chamber communicates with a lower interior portion of the closed vessel, this portion being submerged when the vessel is partially filled with liquid, the remaining interior of the vessel including a gas under pressure.

With the foregoing arrangement, liquid can move into the swirl chamber to increase the liquid level in the vessel and further compress the gas and back out through the swirl chamber to result in a lowering of the level of liquid in the vessel, the lowest level of the liquid always being above the lower interior portion communicating with the lower outlet of the swirl chamber. The overall design is such that the resistance to liquid flow is from 5 to 100 times as great for liquid entering the vessel through the swirl chamber as for liquid leaving the vessel back through the swirl chamber to the header pipe. Further, the apparatus is so designed that there are no moving parts nor obstructions which might result in clogging and yet the desired control of fluid movement is realized.

BRIEF DESCRIPTION OF THE DRAWINGS

A better understanding of the invention will be had by referring to a preferred embodiment thereof as illustrated in the accompanying drawings in which.

DETAILED DESCRIPTION OF THE PREFERRED EMBODIMENT

Figure 1:
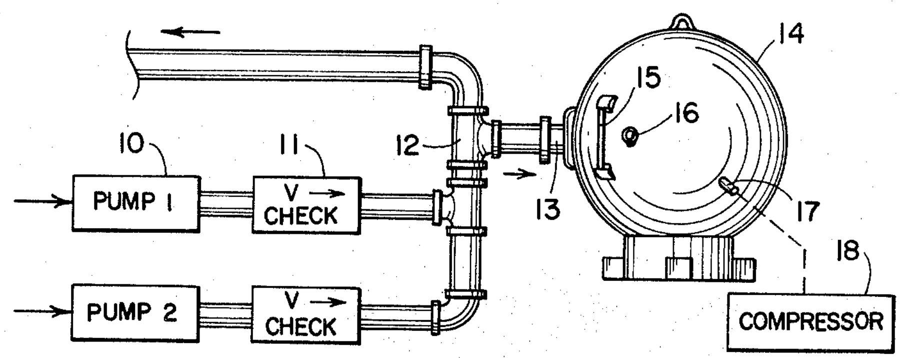
FIG. 1 is a side elevational view schematically illustrating a sewage pump system wherein the hydropneumatic surge absorbing apparatus is used to absorb surges in the system.

Referring to FIG. 1 there is illustrated a sewage system including pumps such as 10 followed by check valves at their output such as indicated at 11. These pumps feed into a common header pipe 12 in the sewage system.

In accord with the invention, there is provided the improved hydropneumatic surge absorbing apparatus having an inlet means 13 connected to the header pipe 12 and extending into the interior of a closed vessel 14. On the exterior of this vessel, there may be provided a liquid level gauge 15, a gas vent 16, and a pneumatic fill valve 17 so that gas pressure within the vessel 14 may be adjusted to a desired level as by means of a compressor 18.

Figure 2:
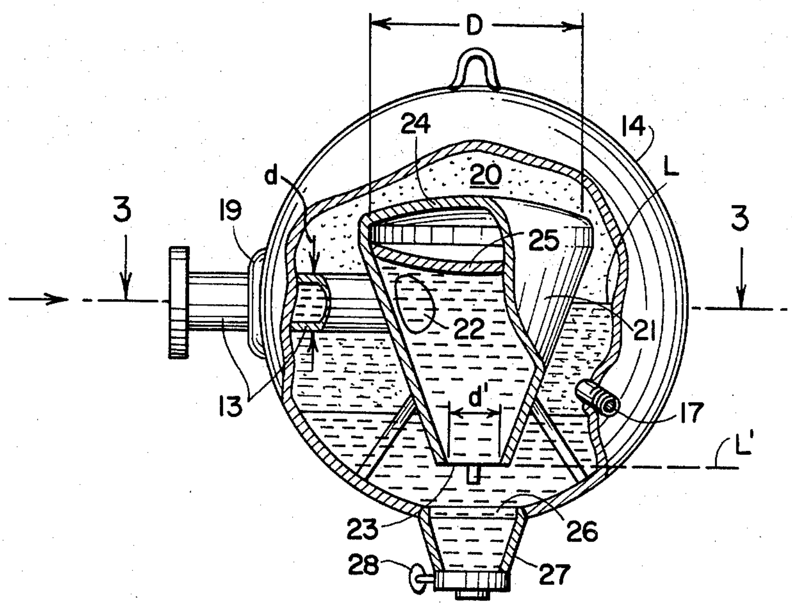
FIG. 2 is an enlarged cut-away view showing interior portions of the apparatus used in FIG. 1; and, FIG. 3 is a cross-section of the apparatus taken in the direction of the arrows 3—3 of FIG. 2.

Referring to FIG. 2, it will be noted that the inlet means take the form of an inlet nozzle or pipe 13 sealingly passing through the wall of the vessel 14 as indicated at 19. The interior of the vessel itself is indicated at 20 and, in the particular embodiment described, incorporates a swirl chamber 21. For preferred operation in sewage system, the swirl chamber 21 is in the form of an inverted truncated cone, the inlet means connecting tangentially adjacent to the inverted base portion of the cone to define an upper inlet 22. The lower apex portion of the inverted cone defines a central outlet opening 23 communicating with a lower interior portion at the outlet opening 23 is at a level L' which is always below the level L of liquid in the vessel 14.

The upper exterior top surface of the inverted base is convex as indicated at 24 so that any debris in the liquid when the level L is above the inverted cone will shed from the cone and not collect thereon. This construction could actually be in the form of an upright dummy cone to facilitate shedding. Preferably the construction is modified at the interior portion of the cone by providing a dummy top plate 25 which will present a non-concave surface facing downwardly towards the apex portion of the cone. This construction is desirable to provide improved pressure drop characteristics in the formation of the vortex of fluid over that which would result were the bottom concave portion of the base 24 serving as the top interior portion of the swirl chamber. While the plate 25 is shown as presenting a convex surface to liquid within the swirl chamber, this plate could be flat and still provide advantages over those which would result were a concave ceiling to the chamber provided.

In the preferred construction, the vessel 14 includes a bottom opening 26 at the mouth of a bottom conical structure 27. This structure 27 incorporates a drain valve 28 at its lower end. By providing such conical construction, the risk of debris or other solid particles in the liquid becoming clogged or trapped in the mechanism is minimized.

Figure 3:
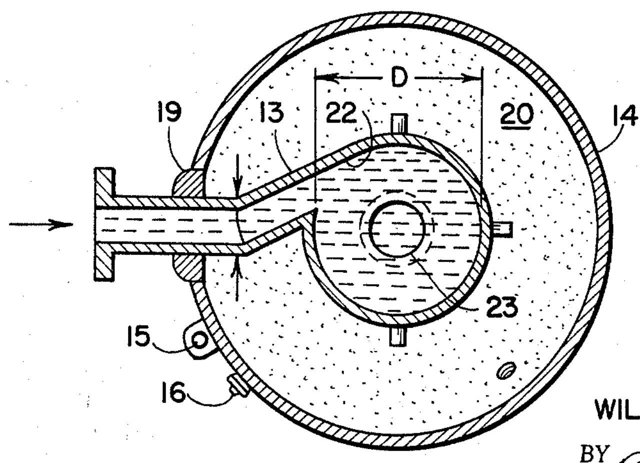

The tangential arrangement of the inlet means 13 and inlet 22 will be evident by reference to FIG. 3. In most applications in sewage systems, the diameter of the inverted base portion of the swirl chamber 21 indicated D in FIGS. 2 and 3 is from 4 to 6 times the diameter of the inlet means 13 as indicated at *d*. Further, to again minimize possibilities of debris becoming clogged in the swirl chamber, the altitude of the truncated inverted cone is preferably greater than the inverted base diameter D.

Finally, the closed vessel 14 itself is preferably spherical to provide an optimum volume in a minimum amount of space. In this respect, the swirl chamber structure 21 can conveniently be disposed within the spherical vessel 14. However, it is possible to locate the swirl chamber exterior of the vessel. In this event, the outlet 23 would pass sealingly through a wall of the vessel 14 and terminate in an opening at substantially the level L' so as to always be submerged under liquid within the vessel.

OPERATION

With the foregoing description of the basic components in mind, the overall operation of the hydropneumatic surge apparatus will now be set forth.

Referring once again to FIG. 1, and as described heretofore, the apparatus is preferably connected into a header pipe immediately following the output check valves for the pumps in the system. This connection should be located as closely as is feasible to the outlets of these one-way check valves.

Referring to FIG. 2, the vessel 14 is approximately half filled with liquid so that the liquid level on the gauge 15 of FIG. 1 will be at about a mid-point. The gas above the liquid which may be air is at a pressure corresponding to the pressure in the sewage piping system. When the pumps are started, the initial surge or shock will be taken up by an inflow of liquid and debris through the inlet means 13 into the swirl chamber 21. A vortex will be established as a consequence of the tangential arrangement of the inlet, the liquid and debris swirling around the interior side walls of the inverted conical structure and exiting into communication with the liquid within the vessel 14. This liquid level will thus be raised with the inflow of liquid resulting in a compression of the gas above the liquid. A substantial portion of the kinetic energy of the fluid flow will thus be absorbed by the resistance afforded by the swirl chamber construction and also in the work done in compressing the gas.

The return surge normally present in the line will be compensated for by a return flow of fluid from the vessel 14 up back through the swirl chamber and the inlet means 13 to the header pipe. The resistance to liquid flow in this direction is substantially less than in the other direction. This lessened resistance is a consequence of the lack of any swirling action on the return flow of the liquid and the relatively large openings and straight through paths provided.

When shutting down the pump, the column of fluid in the piping system will tend by its inertia to keep moving in the direction of the arrows of FIG. 1 thus resulting in a "gap" or low pressure behind the fluid. This gap will be filled by the reverse flow of liquid in the vessel 14 directly into the header pipe thereby cushioning any shock or surge as a consequence of the shutting down of the pumps. The return surge in like manner will be cushioned by the absorbing apparatus in the same manner as when the pumps are initially started.

Any debris and the like will tend to collect in the lower conical drain portion 27 of the vessel 14 because of the conical construction and because of the dome or convex shaped upper exterior wall of the surge chamber. This debris may readily be removed by simply periodically draining the vessel as is required by means of the valve 28.

It will be noted that the entire construction is passive in that there are no moving parts. As a consequence, the overall apparatus is extremely durable and rugged requiring very little maintenance. Further, the geometry of the conical arrangements described in the preferred embodiment minimizes possibilities of clogging and thus the overall apparatus is ideally suited to sewage systems.

As mentioned, the swirl chamber construction is such that the resistance to incoming fluid through the inlet is from 5 to 100 times the resistance to back flow of fluid through the swirl chamber and into the piping system. In most practical applications, the ratio of forward and back resistance flow would be nearer 40 to 50 but wide variation is possible by proper adjustment and sizing of the components.

While a particular embodiment of the invention has been shown and described, the hydropneumatic dampening apparatus is not to be thought of as limited to the specific construction set forth merely for illustrative purposes.

What is claimed is:

1. A hydropneumatic surge absorbing apparatus for connection to a header pipe in a liquid transmission pipe system to eleviate shock and surge caused by starting and shutting down pumps having their associated outlet check valves connected to said header pipe, comprising in combination:
   a. a closed vessel;
   b. a swirl chamber having an upper tangential inlet and lower central outlet, and being in the form of an inverted truncated cone with its lower central outlet at the truncated apex of said cone and its upper tangential inlet adjacent to the inverted base of said cone such that a particle laden liquid passed tangentially into said inlet swirls around to define a vortex prior to flow out said central outlet; and
   c. inlet means for sealingly connecting said upper tangential inlet to said header pipe in said system through which a particle laden liquid subject to shock and surge passes, said lower outlet being positioned above, and in flow communication with a lower interior portion of said closed vessel to facilitate ingress and egress of said particle laden liquid, said lower interior portion being submerged when said vessel is partially filled with said particle laden liquid, the remaining interior of said vessel including a gas under pressure so that said particle laden liquid can move into said swirl chamber to increase the liquid level in said vessel and further compress said gas and back out through said swirl chamber to result in a lowering of the level of liquid in said vessel, the lowest level of liquid always being above said lower interior portion communicating with said lower outlet, said hydropneumatic surge absorbing apparatus being further described in that said swirl chamber construction is such that the resistance to liquid flow is in the range of from 5 to 100 times as great for liquid entering said vessel through said swirl chamber as for liquid leaving said vessel back through said swirl chamber to said header pipe.

2. An apparatus according to claim 1, in which said inverted cone is disposed within said closed vessel with its truncated apex always below the level of liquid in said vessel, said inlet means comprising a passage sealingly connected to said tangential inlet and sealingly passing through a wall of said closed vessel to connect to said header pipe in said system.

3. An apparatus according to claim 2, in which said vessel is spherical in shape.

4. An apparatus according to claim 2, in which said inverted base has a convex shaped exterior top surface so that debris in said vessel will shed therefrom, the interior of said inverted base including an upper end plate defining a non-concave top for the interior of said swirl chamber to provide improved pressure drop characteristics over that which would result were the bottom concave surface of said inverted base to serve as the top interior portion of said swirl chamber.

5. An apparatus according to claim 1, in which the altitude of said truncated cone is greater than its inverted base diameter.

6. An apparatus according to claim 1, in which the inverted base diameter is from 4 to 6 times the diameter of said inlet opening.

7. An apparatus according to claim 1, in which said vessel includes a bottom conical portion incorporating a drain valve for removal of liquid and intermixed debris from said vessel.

* * * * *